United States Patent [19]
Redgate

[11] Patent Number: 5,982,098
[45] Date of Patent: Nov. 9, 1999

[54] SMART LOGIC SWITCHING UNINTERRUPTIBLE POWER SOURCE

[76] Inventor: Robert Redgate, Rte. 1, Box 44, Waynoka, Okla. 73860

[21] Appl. No.: 09/240,295

[22] Filed: Jan. 29, 1999

Related U.S. Application Data

[63] Continuation of application No. 08/918,149, Aug. 25, 1997.
[51] Int. Cl.[6] .................................................. H02J 9/00
[52] U.S. Cl. ........................ 315/86; 315/362; 315/176; 307/66
[58] Field of Search ................... 315/362, 86, 312–323, 315/176, 291; 340/307; 307/66

[56] References Cited

U.S. PATENT DOCUMENTS

| | | | |
|---|---|---|---|
| 4,200,862 | 4/1980 | Campbell et al. | 340/310 A |
| 4,418,333 | 11/1983 | Schwarzbach et al. | 340/310 A |
| 4,628,440 | 12/1986 | Thompson | 364/140 |
| 4,638,299 | 1/1987 | Campbell | 340/310 A |
| 4,703,306 | 10/1987 | Barritt | 340/310 CP |
| 5,154,504 | 10/1992 | Helal et al. | 315/86 |
| 5,471,114 | 11/1995 | Edwards et al. | 315/86 |
| 5,491,463 | 2/1996 | Sargeant et al. | 340/310.01 |
| 5,666,029 | 9/1997 | McDonald | 315/86 |
| 5,734,230 | 3/1998 | Edwards et al. | 315/86 |

*Primary Examiner*—Don Wong
*Assistant Examiner*—Wilson Lee
*Attorney, Agent, or Firm*—McAfee & Taft

[57] ABSTRACT

An uninterruptible power source for emergency lighting in an AC powered electrical system utilizes X-10 protocol transmitters and receivers for transmitting and receiving data signals over existing wiring to emergency wall switches interposed in the wiring for maintaining emergency lighting in the on condition when AC commercial power is interrupted and a battery powered backup unit converting DC to AC is activated upon the interruption of the commercial AC source.

22 Claims, 1 Drawing Sheet

SMART LOGIC SWITCHING UNINTERRUPTIBLE POWER SOURCE

This application is a continuation of copending application Ser. No. 08/918,149 filed on Aug. 25, 1997.

CROSS REFERENCE TO RELATED APPLICATIONS

Not applicable.

STATEMENT REGARDING FEDERALLY SPONSORED RESEARCH OR DEVELOPMENT

Not applicable.

This invention relates to lighting systems and more particularly to a backup power source utilizing existing wiring in the event of loss of commercial power.

BACKGROUND OF THE INVENTION

It is essential in commercial establishments such as manufacturing plants, high rise office buildings, hospitals and the like, that emergency lighting be provided in the event of interruption of commercial power. In areas of manufacturing facilities where loss of lighting and commercial power results in necessary shut down of equipment, requiring the evacuation of personnel, sufficient emergency lighting must be provided to enable personnel to safely leave the facilities. This invention provides a fail safe electric light emergency system utilizing existing wiring and known code transmission and receiving protocol to accomplish the above desired results.

BRIEF SUMMARY OF THE INVENTION

An uninterruptible emergency power supply is connected with any commercial AC supply circuit at the breaker panel. The emergency power supply is switched on through a nanosecond switch in response to interruption of the commercial AC power. The system further includes batteries, an inverter, a logic code oscillator/transmitter and code receivers within emergency wall switches installed at selected locations in existing wiring for receiving logic transmission.

The emergency wall switch includes a normally open secondary switch, connected in parallel with a wall switch, relay closed to bypass the wall switch in response to a code received by the logic receiver.

The principal objects of this invention are to provide an emergency power backup system which utilizes existing wiring downstream from a breaker panel for turning on emergency lights or signals and monitoring the presence or absence of personnel in building egress positions; which maintains a minimum of lighting when the egress routes are vacant and turns off the emergency lights or alarms when commercial line voltage is restored; and to provide an improved wall switch which permits operation of components connected with existing wiring by current control circuitry connected with the building wiring and accessed from a remote location.

DESCRIPTION OF THE PREFERRED EMBODIMENTS

Figure 1:
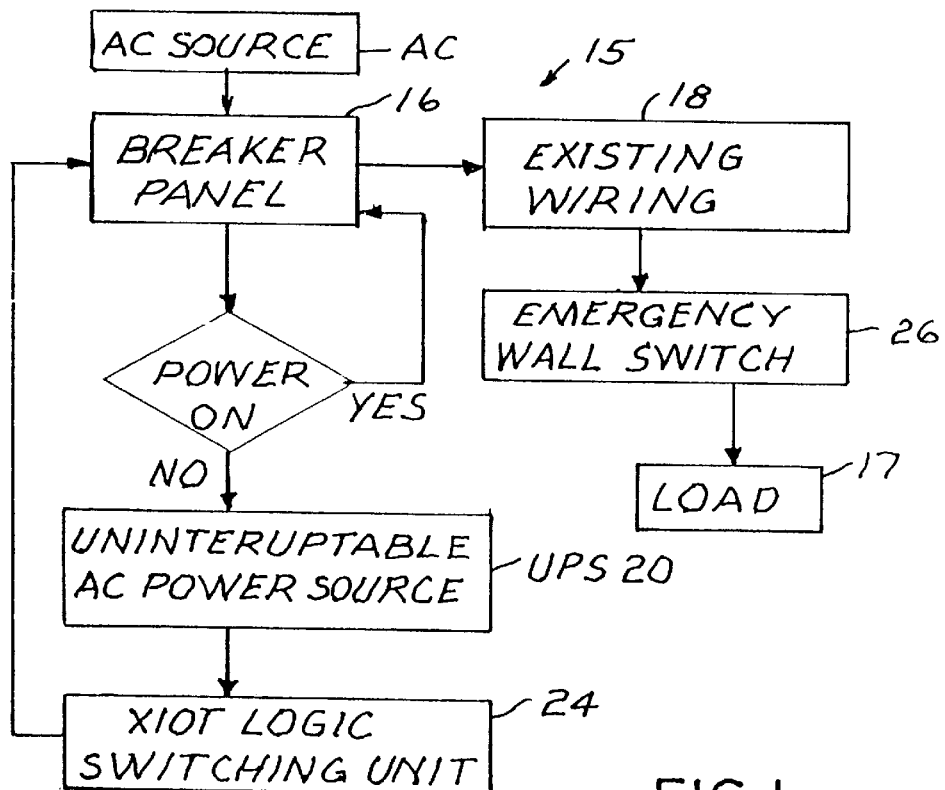
FIG. 1 is a flow diagram of the system.

Like characters of reference designate like parts in those figures of the drawings in which they occur.

In the drawings:

This AC emergency backup electrical system utilizes data protocol known as the X-10 protocol which was developed by Pico Electronics of Fife, Scotland. These products are distributed in the United States by X-10 (U.S.A.) Inc., of Northvale, N.J. 07647. The X-10 protocol utilizes an X-10 receiver (X-10R) electronic switch interposed in the wiring in an electrical wall switch location. The receiver is turned on and off by data transmitted over electrical wires from an X-10 transmitter (X-10T) energizing and de-energizing the receiver X-10R. The transmission of data from the transmitter to the receiver is synchronized with the zero crossing of AC sine wave and the data transmitted comprises a series of four bits as a start code (1110). In this invention an eleven bit code sequence is used for the transmission of data controlling the receiver.

Referring to the flow chart 15 a source of alternating current AC is connected with a breaker panel 16 for supplying electrical power to components, such as electrical lighting 17, connected with existing wiring 18.

A conventional uninterruptible AC power source (UPS) 20 is connected with the breaker panel 16 for supplying AC in the event of current interruption. The backup AC power source 20 may be obtained from American Power Conversion Inc., 132 Fair Grounds Road, West Kingston, R.I. 02892. The UPS 20 includes a nanosecond switch, batteries and an inverter, none of which are shown. Upon interruption of commercial AC power for more than three or four nanoseconds the UPS 20 converts battery potential to at least 100 volts AC sine wave applied to the existing wiring 18 through a logic switching unit 24 and the breaker panel 16.

Figure 3:
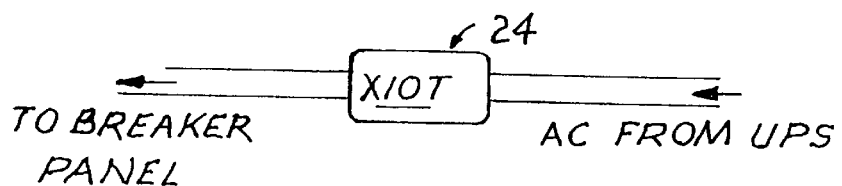
FIG. 3 is a wiring diagram.

The logic switching unit 24 includes a modified X-10 transmitter, X-10T (FIG. 3) preferably model A, for transmitting a code, using the X-10 protocol, through the breaker panel 16 and existing wiring 18 to trigger logic controlled switches and emergency lighting wall switches 26.

Figure 2:
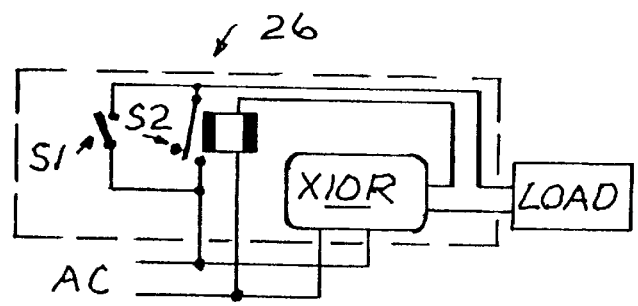
FIG. 2 is a wiring diagram of an emergency wall switch.

Referring more particularly to FIG. 2 the emergency wall switch 26 comprises a primary switch S1 interposed in the hot AC source wire to emergency lighting 17. A relay, including a normally open switch S2, is connected in parallel with the primary switch S1 through a modified X-10 receiver X-10R interposed between the AC source and the emergency lighting 17 for controlling the on/off position of the switch S2. The transmitter X-10T signals the receiver X-10R to energize the relay and close the switch S2 to turn on the emergency lights 17, if not on, and to stay on regardless of the position of the switch S1.

The X-10 receiver is modified to comply with the Underwriters Laboratories Code which states that a light turned on during power outage cannot be turned off by a switch or other conventional methods.

Obviously the invention is susceptible to changes or alterations without defeating its practicability. Therefore, I do not wish to be confined to the preferred embodiments shown in the drawings and described herein.

I claim:

1. In combination with a primary source of AC normally supplying current to an electrical system, including wiring and emergency lighting, the improvement comprising:

a normally inactive uninterruptible power supply unit connected to supply AC to the electrical system when the primary source of AC power is interrupted;

an encoding protocol transmitter connected to transmit over the wiring of the electrical system a preprogrammed code signal when the primary source of AC is interrupted; and an emergency wall switch including a switch and an encoding protocol receiver connected to the wiring and the emergency lighting, wherein the receiver operates the switch in response to receiving the transmitter code signal to ensure the emergency lighting is connected to the wiring of the electrical system being supplied with AC from the uninterruptible power supply such that the emergency lighting is illuminated while the primary source of power is interrupted.

2. The combination as defined in claim 1, wherein the preprogrammed code signal is encoded in accordance with X-10 protocol.

3. The combination as defined in claim 1, wherein the switch is connected in electrical parallel with a primary on/off switch connected to the wiring and emergency lighting to which the first-mentioned switch is connected.

4. A switch apparatus for an electrical wiring system including lighting:
   a primary switch adapted to be connected in the wiring system to control the on/off condition of the lighting when a primary power source is providing sufficient electricity to the wiring system;
   a secondary switch connected in electrical parallel with the primary switch; and
   a power line communication protocol receiver connected to the secondary switch and adapted to be connected to the wiring system, the receiver adapted to operate the secondary switch in response to a predetermined power line communication protocol code signal transmitted over the wiring system and received by the receiver such that at least the secondary switch connects the lighting to the wiring system conducting electricity from a backup power source when the primary source of electricity is interrupted.

5. A switch apparatus as defined in claim 4, wherein the receiver is responsive to X-10 protocol as the power line communication protocol.

6. A switch apparatus as defined in claim 4, wherein:
   the wiring system includes a first wire and a second wire;
   the parallel-connected primary switch and secondary switch are adapted to connect to the first wire and to the lighting; and
   the receiver connected to the secondary switch is adapted to connect to the first and second wires and to the lighting.

7. A backup electrical power and control system for a power line installation having at least two wires connected to a primary source of alternating current electricity, comprising:
   a backup source of alternating current electricity connected to the power line installation;
   a transmitter connected to the power line installation such that the transmitter transmits over wires of the power line installation a power line communication protocol encoded signal when the primary source of alternating current electricity is interrupted and the backup source is providing alternating current electricity over the same wires of the power line installation;
   a switch connected to at least one of the wires and to a load to be energized by alternating current electricity from either the primary source or the backup source; and
   a receiver connected to the power line installation such that the receiver receives the power line communication protocol encoded signal transmitted by the transmitter and operates the switch in response thereto to control the connected load with alternating current electricity from the backup source in a backup operation mode.

8. A backup electrical power and control system as defined in claim 7, wherein the power line communication protocol includes X-10 protocol.

9. A backup electrical power and control system as defined in claim 8, wherein the load includes an emergency light.

10. A backup electrical power and control system as defined in claim 9, further comprising a primary switch connected in electrical parallel with the first-mentioned switch, wherein the primary switch controls the connected load with alternating current electricity from the primary source in a normal operation mode.

11. A backup electrical power and control system as defined in claim 7, further comprising a primary switch connected in electrical parallel with the first-mentioned switch, wherein the primary switch controls the connected load with alternating current electricity from the primary source in a normal operation mode.

12. A method of providing electrical power and control to power line wires conducting alternating current electricity from a primary power source during a normal operation mode, comprising:
   sensing an interruption in the electricity from the primary power source and providing alternating current electricity to the power line wires from a backup power source;
   transmitting an encoded electrical signal over the power line wires in response to sensing an interruption in the electricity from the primary power source; and
   receiving the encoded electrical signal over the power line wires and in response thereto communicating alternating current electricity provided by the backup power source over the power line wires to a load such that the load is energized when alternating current electricity from the primary power source is interrupted.

13. A method as defined in claim 12, wherein the encoded electrical signal is transmitted in accordance with X-10, protocol.

14. A method as defined in claim 13, wherein the encoded electrical signal is transmitted through a breaker panel connected to the power line wires.

15. A method as defined in claim 14, wherein the alternating current electricity is provided through the breaker panel.

16. A method as defined in claim 12, wherein the encoded electrical signal is transmitted through a breaker panel connected to the power line wires.

17. A method as defined in claim 16, wherein the alternating current electricity is provided through the breaker panel.

18. A method as defined in claim 12, wherein communicating alternating current electricity to the load includes controlling a switch connected to at least one of the power line wires and the load.

19. A method as defined in claim 18, wherein the load includes emergency lighting.

20. A method as defined in claim 19, wherein the encoded electrical signal is transmitted in accordance with X-10 protocol.

21. A method as defined in claim 20, wherein the encoded electrical signal is transmitted through a breaker panel connected to the power line wires.

22. A method as defined in claim 21, wherein the alternating current electricity is provided through the breaker panel.

* * * * *